Feb. 16, 1954
K. W. COUSE
2,669,481
TAIL GATE FOR ENCLOSING THE REAR-END OF TRAILERS
Filed May 6, 1952
3 Sheets-Sheet 1
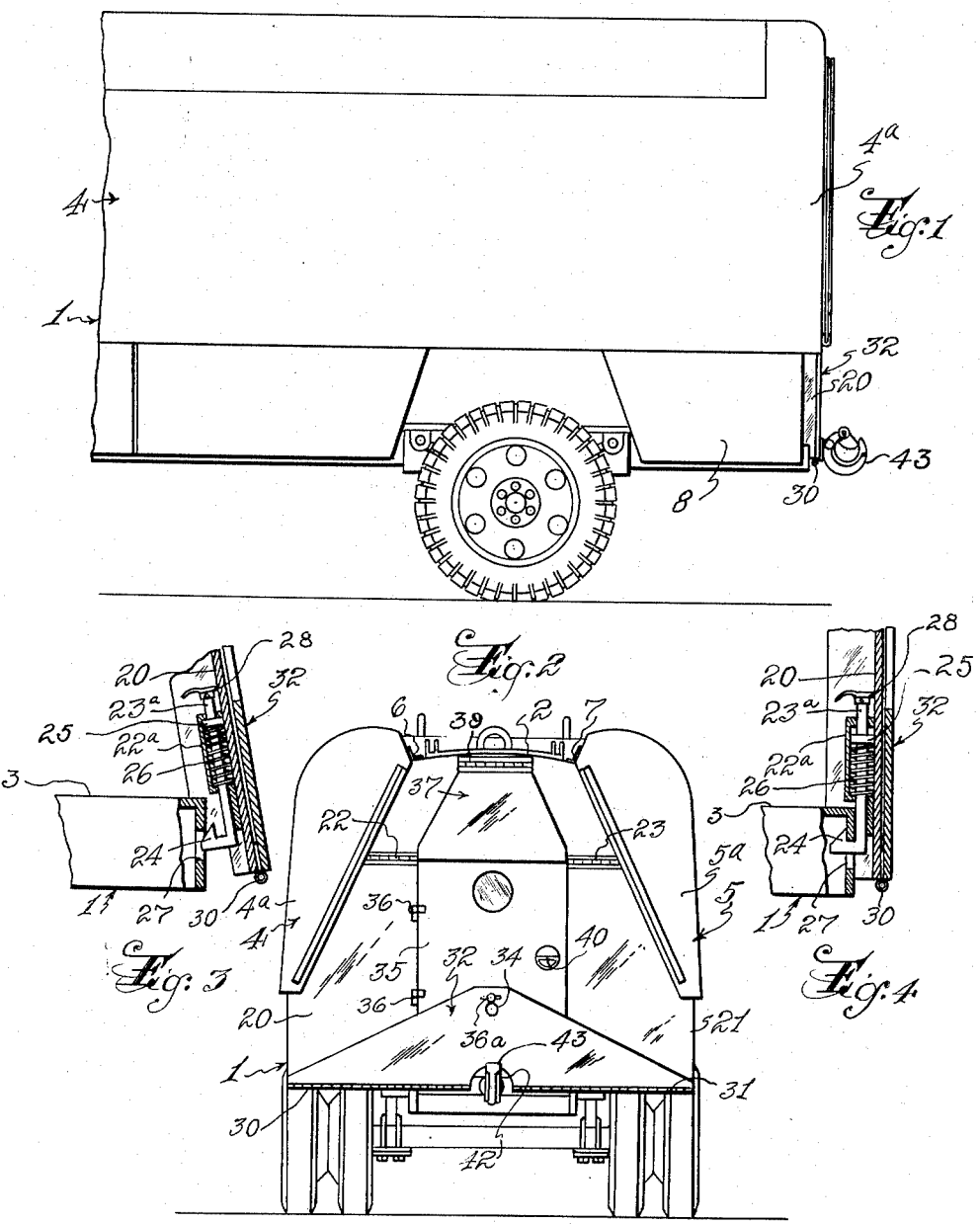
Inventor:
Kibbey W. Couse
BY
Harry B. Rook,
Attorney.

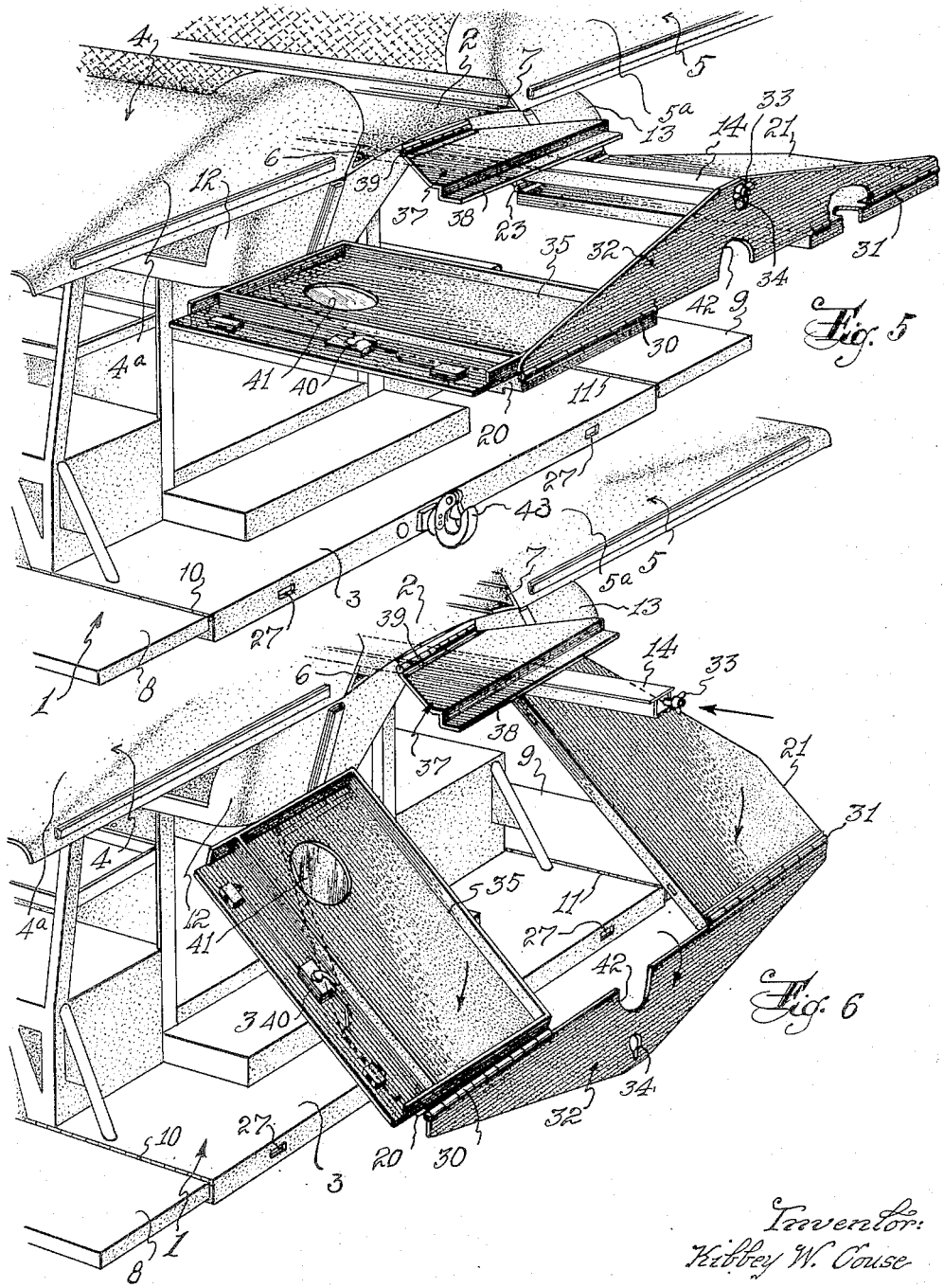

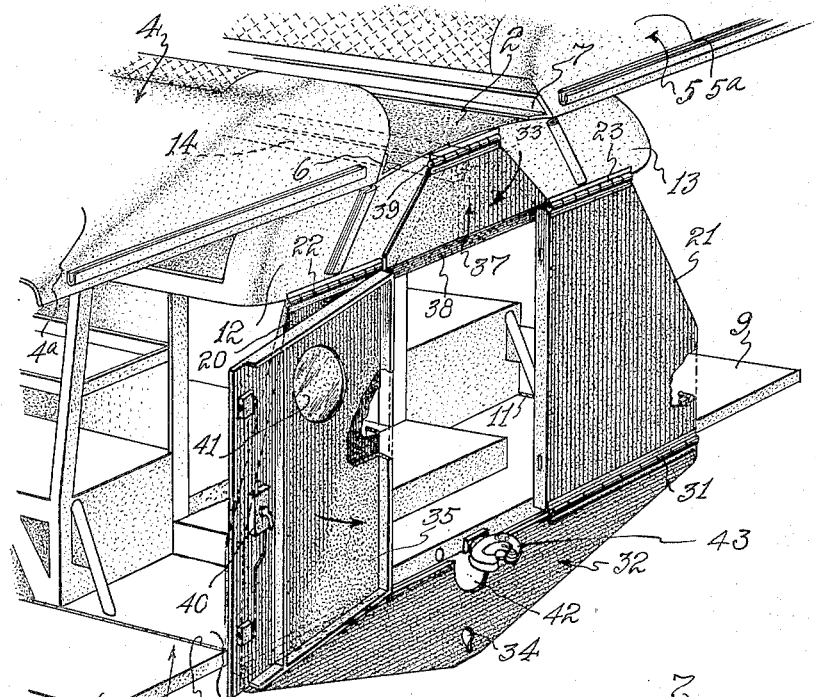

Patented Feb. 16, 1954

2,669,481

UNITED STATES PATENT OFFICE 2,669,481

TAIL GATE FOR ENCLOSING THE REAR END OF A TRAILER

Kibbey W. Couse, Newark, N. J., assignor to Reconstruction Finance Corporation, New York, N. Y., a corporation of the United States Application May 6, 1952, Serial No. 286,378

5 Claims. (Cl. 296—106)

1

My invention relates to a tail gate for enclosing the rear end of a trailer and is particularly adapted for use on a trailer of the type illustrated in my application for a design patent on a Machine Shop Trailer, Serial No. D. 18,822, filed March 7, 1952, now Patent D. 168,535.

It is an object of my invention to provide a tail gate for enclosing the rear end of a trailer and including a pair of panels hingedly connected to the trailer roof which panels may be secured in open positions to the projecting end of a hoist supporting member slidably mounted in the trailer and which panels are separated by an opening which lies directly beneath the projecting portion of such supporting member when the panels occupy their open positions.

It is another object of my invention to provide a tail gate of the described type having a flap hingedly connected to the roof to complete the end enclosure provided by the tail gate which flap lies in the path of the slidably mounted supporting member but is folded upwardly when the supporting member projects beyond the end of the trailer.

Other objects and advantages of my invention will appear as the course of the specification develops.

To attain the objects and advantages of my invention I provide a trailer, having a hoist supporting member slidably mounted in the trailer which supporting member may be projected beyond the rear end of the trailer, with a pair of panels hingedly connected to the trailer roof and extending therefrom in their closed positions to the trailer floor. Means are provided for securing these panels in open positions to the hoist supporting member when such member projects beyond the rear end of the trailer. The panels are separated by an opening which lies directly beneath the projecting portion of the hoist supporting member when the panels occupy their open positions. The hoist supporting member may therefore be used beyond the end of the truck with the panels in such open positions. A flap forming a substantially complete end enclosure with the panels is hingedly connected to the roof in the path of the hoist supporting member. This flap is folded upwardly when the hoist supporting member projects beyond the end of the trailer.

I shall describe one form of my invention and point out the novel features thereof in claims.

In the accompanying drawings:

Figure 1 is a side elevational view of a trailer provided with my tail gate;

2

Figure 2 is a rear end view of the trailer of Fig. 1;

Figure 3 is a vertical sectional view of the locking device for securing the panels of the tail gate to the floor of the trailer, the device being shown therein preparatory to assuming its locked condition;

Figure 4 is a view similar to Fig. 3 with the locking device being shown in its locked condition;

Figures 5 through 8 illustrate the manner of changing the position of the tail gate from its open to its closed position and of folding the side panels of the trailer to ready the trailer for transportation.

Referring to the drawings, reference character I designates a trailer of the type illustrated in my application for a design patent Serial No. D. 18,822, filed March 7, 1952. Trailer 1 has a roof 2, a floor 3, a pair of upper side panels 4 and 5 connected to roof 2 by hinge members 6 and 7 respectively, and a pair of lower side panels 8 and 9 connected to floor 3 by hinge members 10 and 11 respectively. Roof 2 is provided on opposite sides thereof at the rear end of the trailer with overhanging end portions 12 and 13. Upper side panels 4 and 5 are also provided with overhanging rear end portions 4a and 5a respectively. Slidably mounted within trailer 1 is a hoist supporting member 14 which may be projected between end portions 12 and 13 and beyond the end of the trailer.

The tail gate (shaded in the drawing) includes a pair of panels 20 and 21 which are hingedly connected by hinge members 22 and 23 to the lower edges of end portions 12 and 13 respectively and which panels extend therefrom when in closed positions to the edge of floor 3. Panels 20 and 21 in their closed positions abut against the edge of floor 3 and against the rear edge of each of lower side panels 8 and 9 provided such side panels are folded in upright positions. Suitable means are provided for securing panels 20 and 21 in closed positions to the floor 3. For this purpose each of panels 20 and 21 may be provided near their lower edges on the inside surfaces thereof with a locking device such as shown in Figs. 3 and 4. Each locking device comprises a cylinder 22a which is secured upon one of the panels, a locking bar 23a having a hook 24 formed on one end and a piston 25 secured thereon intermediate its ends which functions in cylinder 22a, and a spring 26 which biases piston 25 and locking bar 23a to a predetermined position determined by the upper end of cylinder 22a. Hook 24 is insertable into a recess 27 provided in floor 3, two such recesses being provided in floor 3, one for each locking device. Spring 26 is compressed in the process of inserting hook 24 into recess 27 and the compressed spring serves to lock the hook in position. The upper end of locking bar 23a is provided with a handle 28 useful in depressing bar 23a for removing hook 24 from recess 27 when panels 20 and 21 are to be moved from their closed positions to open positions in which open positions the panels occupy substantially horizontal positions (Fig. 5).

Panels 20 and 21 are hingedly connected at their lower edges by hinge members 30 and 31 respectively to another portion of the tail gate, namely, triangular shaped flap 32. Triangular flap 32 is provided with a cut 42 to enable the flap to be moved from a depending position to an upright position about coupling member 43 which is pivotally mounted on floor 3. Flap 32 serves to hold panels 20 and 21 in their open positions being secured when the panels occupy such open positions to the projected end of hoist supporting member 14 by suitable means including wing nut 33 extending through opening 34 in flap 32. It will be noted that the space or opening between panels 20 and 21 lies directly beneath the projecting portion of hoist supporting member 14 when the panels are in their open positions. Thus, although the panels are in their open positions, member 14 may be utilized as a support beyond the end of the hut for the lifting of heavy objects located in the area beneath its projecting portion. Panel 20 has a door 35 hingedly connected thereto by hinge members 36 for closing the aforesaid opening between panels 20 and 21 when the panels are in their closed positions. Door 35 is provided with a port-like window 41 and a suitable locking device 40. When panels 20 and 21 occupy their closed positions and door 35 is closed, flap 32 is folded against the door and panels, being secured in such position by suitable means including wing nut 36a extending through recess 34 in flap 32.

The tail gate includes another flap 37 hingedly connected by hinge members 39 along its top edge to roof 2 between overhanging end portions 12 and 13, and having its lower edge 38 formed to overlap the upper edge 45 of door 35. Flap 37 is located directly in the path of member 14 and is folded upwardly when the said member 14 is projected beyond the end of the trailer. The flap is held in such folded position by the projecting portion of member 14.

When it is desired to move the tail gate from an open position as viewed in Fig. 5 to a closed position as viewed in Fig. 8, flap 32 is disconnected from member 14 whereupon panels 20 and 21 are lowered to their closed positions where they are secured by the locking devices already described. Member 14 is moved inwardly and flap 37 is also lowered to a closed position. Door 35, which normally occupies an open position while the tail gate is secured in its open position is then closed. In the closed position of door 35, lower edge 38 of flap 37 overlaps upper edge 45 of the door. Triangular shaped flap 32 is folded upwardly and secured in position against panels 20 and 21, and door 35.

Upper side panels 4 and 5 and lower side panels 8 and 9 occupy outwardly extending positions when the trailer is stationary and in use. When the trailer is to be readied for transportation, however, the tail gate is secured in its closed position and the aforementioned upper and lower side panels are moved inwardly. Lower side panels 8 and 9 are folded upwardly to substantially upright positions and upper panels 4 and 5 are folded downwardly to positions indicated in Fig. 8 in which positions the end portions 4a and 5a of upper panels 4 and 5 preferably overlap the edges of panels 20 and 21.

Although I have herein shown and described only one form of my invention it is to be understood that various changes and modifications may be made therein within the scope of the appended claims without departing from the spirit and scope of my invention.

Having thus described my invention, what I claim is:

1. In combination with a trailer having a roof, a floor and suitable side sections connected to the roof and floor which roof, floor and side sections for the most part define the general outline of the trailer, and having a member slidably mounted in the trailer and projected at times beyond the rear end of the trailer; a tail gate for enclosing the rear end of the trailer comprising a pair of normally vertical end panels hinged on horizontal axes along their upper edges to the trailer roof and extending therefrom when in a closed position to the trailer floor, the panels being separated by an opening which lies directly beneath the projecting portion of the supporting member with the panels in an open position, and a door hingedly connected to one of the panels for closing said opening; and means for securing said panels in an elevated horizontal open position to the supporting member to hold said panels in open position.

2. In combination with a trailer having a roof, a floor and suitable side sections connected to the roof and floor which roof, floor and side sections for the most part define the general outline of the trailer, and having a supporting member slidably mounted in the trailer and projected at times beyond the rear end of the trailer; a tail gate for enclosing the rear end of the trailer comprising a pair of end panels hinged along their upper edges to the trailer roof and extending therefrom when in a closed position to the trailer floor, the panels being separated by an opening which lies directly beneath the projecting portion of the supporting member with the panels in an open position, a door hingedly connected to one of the panels for closing said opening, and a flap hingedly connected to the lower edges of the panels foldable against the panels and against the door when closed; means for securing said flap in position against the panels and door; and other means for securing the flap to the supporting member to hold the panels in an open position.

3. In combination with a trailer having a roof, a floor and suitable side sections connected to the roof and floor which roof, floor and side sections for the most part define the general outline of the trailer, and having a supporting member slidably mounted in the trailer and projected at times beyond the rear end of the trailer; a tail gate for enclosing the rear end of the trailer comprising a pair of end panels hinged along their upper edges to the trailer roof and extending therefrom when in a closed position to the trailer floor, the panels being separated by an opening which lies directly beneath the projecting portion of the supporting member with the panels in an open position, a door hingedly connected to one of the panels for closing said opening, a first flap hingedly connected to the lower edges of the panels foldable against the panels and against the door when closed, and another flap in the path of the supporting member hingedly connected to the roof which flap is folded upwardly when the hoist supporting member projects beyond the rear end of the trailer; means for securing said first flap in position against the panels and door; and other means for securing said first flap to the supporting member to hold the panels in an open position.

4. In combination with a trailer having a roof, a floor and suitable side sections connected to the roof and floor which roof, floor and side sections for the most part define the general outline of the trailer, and having a supporting member slidably mounted in the trailer and projected at times beyond the rear end of the trailer; a tail gate for enclosing the rear end of the trailer comprising a pair of end panels hinged along their upper edges to the trailer roof and extending therefrom when in a closed position to the trailer floor, the panels being separated by an opening which lies directly beneath the projecting portion of the supporting member with the panels in an open position, a door hingedly connected to one of the panels for closing said opening, a first flap hingedly connected to the lower edges of the panels foldable against the panels and against the door when closed; and another flap in the path of the supporting member hingedly connected to the roof which flap is folded upwardly when the supporting member projects beyond the rear end of the trailer and which flap has its lower edge adapted to overlap the upper edge of the door when both are closed; means for securing said first flap in position against the panels and door; and other means for securing said first flap to the supporting member to hold the panels in an open position.

5. The combination as set forth in claim 4 with the addition of locking means for securing the panels in their closed positions to the trailer floor.

KIBBEY W. COUSE.

References Cited in the file of this patent

UNITED STATES PATENTS

| Number | Name | Date |
|---|---|---|
| 460,309 | Miller | Sept. 29, 1891 |
| 787,053 | Salomon | Apr. 11, 1905 |
| 1,022,749 | Messner | Apr. 9, 1912 |

FOREIGN PATENTS

| Number | Country | Date |
|---|---|---|
| 31,378 | Switzerland | Sept. 12, 1904 |